United States Patent
Kawa et al.

(10) Patent No.: US 9,106,603 B2
(45) Date of Patent: Aug. 11, 2015

(54) APPARATUS, METHOD AND COMPUTER-READABLE STORAGE MEDIUMS FOR DETERMINING APPLICATION PROTOCOL ELEMENTS AS DIFFERENT TYPES OF LAWFUL INTERCEPTION CONTENT

(75) Inventors: Claude Kawa, Montreal (CA); Bob Kontopoulos, Montreal (CA)

(73) Assignee: Synchronics plc, Kent (GB)

( * ) Notice: Subject to any disclaimer, the term of this patent is extended or adjusted under 35 U.S.C. 154(b) by 524 days.

(21) Appl. No.: 12/645,909

(22) Filed: Dec. 23, 2009

(65) Prior Publication Data

US 2011/0154181 A1 Jun. 23, 2011

(51) Int. Cl.
- G06F 17/00 (2006.01)
- H04L 29/06 (2006.01)
- G06F 17/22 (2006.01)

(52) U.S. Cl.
CPC ............ H04L 63/00 (2013.01); G06F 17/2247 (2013.01); H04L 63/30 (2013.01)

(58) Field of Classification Search
CPC ............ G06F 17/2247; G06F 17/2705; G06F 17/272; G06F 17/2725
USPC .......................... 715/200, 234, 236, 237, 241
See application file for complete search history.

(56) References Cited

U.S. PATENT DOCUMENTS

| | | |
|---|---|---|
| 6,418,208 B1 | 7/2002 | Gundlach et al. |
| 2003/0190032 A1 | 10/2003 | Ravishankar |
| 2005/0240771 A1* | 10/2005 | Ginter et al. ................. 713/176 |
| 2007/0088670 A1 | 4/2007 | Laurila |
| 2007/0211639 A1 | 9/2007 | Spalt |
| 2007/0271242 A1* | 11/2007 | Lindblad .......................... 707/3 |

(Continued)

FOREIGN PATENT DOCUMENTS

| | | |
|---|---|---|
| EP | 1 780 845 A1 | 5/2007 |
| EP | 1 976 186 | 10/2008 |

(Continued)

OTHER PUBLICATIONS

*Lawful Interception for IP Networks*; Aqsacom Document No. 040451; Nov. 2005; pp. 1-37; Copyright 2003-2005 Aqsacom Inc. and and Aqsacom SA.

(Continued)

*Primary Examiner* — Stephen Hong
*Assistant Examiner* — Gregory J Vaughn
(74) *Attorney, Agent, or Firm* — Soquel Group LLC

(57) ABSTRACT

An example apparatus is provided that includes a processor and a memory storing executable instructions that in response to execution by the processor cause the apparatus to at least perform a number of operations. The operations include receiving a communication including an application protocol primitive that itself includes protocol information element(s). The operations also include comparing the application protocol primitive to a protocol document type definition (DTD) including a plurality of elements, and lawful interception attribute(s) for one or more of its elements. The application protocol primitive is compared to the DTD to identify lawful interception attributes of protocol information element(s) of the primitive. The operations also include preparing one or more of the protocol information elements for transmission to an interception monitoring facility according to the lawful interception attributes of the respective protocol information element(s).

19 Claims, 6 Drawing Sheets

(56) References Cited

U.S. PATENT DOCUMENTS

| | | | |
|---|---|---|---|
| 2007/0271463 A1* | 11/2007 | Ginter et al. | 713/176 |
| 2008/0010256 A1* | 1/2008 | Lindblad et al. | 707/3 |
| 2008/0148397 A1 | 6/2008 | Litvin et al. | |
| 2008/0162652 A1* | 7/2008 | True et al. | 709/206 |
| 2008/0235186 A1 | 9/2008 | Laurila | |
| 2008/0250241 A1* | 10/2008 | Ginter et al. | 713/156 |
| 2009/0097420 A1 | 4/2009 | Chiang et al. | |
| 2009/0232128 A1 | 9/2009 | Paulis et al. | |
| 2009/0254572 A1* | 10/2009 | Redlich et al. | 707/10 |
| 2010/0094987 A1* | 4/2010 | Spalt | 709/224 |
| 2010/0235453 A1* | 9/2010 | Attanasio et al. | 709/206 |
| 2010/0250497 A1* | 9/2010 | Redlich et al. | 707/661 |
| 2010/0325698 A1* | 12/2010 | Ginter et al. | 726/4 |

FOREIGN PATENT DOCUMENTS

| | | |
|---|---|---|
| WO | WO 02/062037 A2 | 8/2002 |
| WO | WO 2007/042624 | 4/2007 |
| WO | WO 2007/105193 | 9/2007 |
| WO | WO 2008/116802 | 10/2008 |
| WO | WO 2009/038510 | 3/2009 |
| WO | WO 2009/103340 | 8/2009 |
| WO | WO 2009/103340 A1 | 8/2009 |

OTHER PUBLICATIONS

*Lawful Interception for 3G Networks*; Aqsacom Document No. 040450; Nov. 2005; pp. 1-23; Copyright 2003-2005 Aqsacom Inc. and and Aqsacom SA.

ETSI TS 101 671 v3.2.1 (Dec. 2007), Lawful Interception (LI); Handover interface for the lawful interception of telecommunications traffic, Technical specification, European Telecommunications Standards Institute, Dec. 2007, pp. 1-125.

ETSI TS 102 232-2 v2.4.1 (Oct. 2009), Lawful Interception (LI); Handover Interface and Service-Specific Details (SSD) for IP delivery; Part 2: Service-specific details for E-mail services, Technical specifcation, European Telecommunications Standards Institute, Oct. 5, 2009, pp. 1-44.

International search report and written opinion for corresponding international application No. PCT/FI2010/050851 dated Mar. 14, 2011, pp. 1-13.

* cited by examiner

APPARATUS, METHOD AND COMPUTER-READABLE STORAGE MEDIUMS FOR DETERMINING APPLICATION PROTOCOL ELEMENTS AS DIFFERENT TYPES OF LAWFUL INTERCEPTION CONTENT

TECHNICAL FIELD

Example embodiments of the present invention generally relate to an apparatus, method and computer-readable storage medium for processing lawful interception requests and, more particularly, relate to an apparatus, method and computer-readable storage medium for determining application protocol elements as different types of lawful interception content.

BACKGROUND

In many of the world's countries, there is a certain interest in being able to monitor telecommunication processes and contents for subscribers under particular circumstances. In this case, by way of example, telephone calls need to be monitored, but emails, short messages (known as SMS), faxes etc. also need to be read. Legal constraints and principles for telecommunication monitoring are then usually stipulated in various national acts and/or decrees in the respective countries—such as in a police act, in the code of criminal procedure, in a constitutional act, in a telecommunication monitoring decree, etc. These acts and decrees rule that the telecommunication monitoring may be performed only for the purpose of criminal prosecution and can be arranged only by a judge, for example.

The technical expression "lawful interception" (LI) denotes a security process in this context. By this means, an operator of a telecommunication network or a provider of telecommunication services (e.g., Internet provider, internet protocol (IP) telephony provider, etc.) allows a national office or authority authorized for monitoring (e.g., police, customs tracing, etc.), which is generally also referred to as a law enforcement agency (LEA), to access telecommunication processes and contents (e.g., telephone calls, email traffic or fax traffic, call-related data such as dialed telephone number, telephone number of an incoming call, etc.) for a particular subscriber. Lawful interception usually allows the nationally authorized office or authority to enter particular calls and thereby to eavesdrop on/monitor the telecommunication processes of a particular subscriber which are taking place therein.

Usually, what is known as a lawful interception interface for a data transmission between the telecommunication network operator or telecommunication service provider and the monitoring office or authority is set up for this purpose in the telecommunication network. In an instance of monitoring, this lawful interception interface is then used to transmit, by way of example, data—such as call content, fax data, call-related data, content of emails or short messages—from the telecommunication network to a monitoring device of the legally authorized office or authority, usually in real time.

To make it easier to implement lawful interception and in order also to allow cross-border—e.g., Europe-wide—monitoring of telecommunication processes and contents, standards and technical specifications have been developed for lawful interception and the relevant interfaces—examples being ES 201 671 Telecommunications Security; Lawful Interception (LI); Handover Interface for Lawful Interception of Telecommunications Traffic; TS 101 232 Telecommunications Security; Lawful Interception (LI); Handover Specification for IP delivery, etc., which have been published by the Technical Committee on Lawful Interception (TC LI) of the European Telecommunications Standards Institute (ETSI). These standards and technical specifications for lawful interception which has been published by ETSI are used primarily in Europe, in large parts of Asia and in some cases also in Australia. These standards provide a very detailed description not only of the architecture of a system and the interfaces for lawful interception but also of telecommunication-network-specific protocol requirements and procedures which are necessary in order to transmit data for the telecommunication processes of a monitored subscriber from the telecommunication network operator or provider of telecommunication services to the office or authority legally authorized for monitoring.

In the United States, the principles for lawful interception have been defined in what is known as the Communications Assistance for Law Enforcement Act (CALEA) and have been supplemented by publications from various committees of the Alliance for Telecommunications Industry Solutions (ATIS)—such as PTSC LAES (Packet Technologies and Systems Committee Lawfully Authorized Electronic Surveillance) or WTSC LI (Wireless Technologies and Systems Committee Lawful Intercept)—for various telecommunication network types, such as mobile radio networks, IP-based networks, etc.

BRIEF SUMMARY

In view of the foregoing background, example embodiments of the present invention are directed to the lawful interception (LI) of application protocol messages such as email, instant messaging (IM) or social networking messages exchanged between users' devices via appropriate network servers, gateways or the like. Application-level LI may include a server/gateway intercepting the communication from a user device and send it to a LI platform. In turn, the LI processes the communication and sends it to a LEA Interception Monitoring Facility (IMF). According to various LI frameworks, intercepted communications may fall into one of a number of different categories or types, including Content of Communication (CC) and Intercept Related Information (IRI).

One of the tasks of many LI platforms is to determine whether protocol elements in intercepted communications are of the CC or IRI type. However, existing LI specifications have not addressed application-level LI and a fortiori have not classified application-protocol information elements as CC or IRI. Example embodiments of the present invention therefore provide an apparatus, method and computer-readable storage medium for automatically determining application protocol elements as different types of LI content, such as CC or IRI. Example embodiments of the present invention may be applicable to any of a number of different application protocols, such as any of a number of different email, messaging (e.g., SMS), instant messaging (IM), social-networking protocols or the like. Further, as explained below, example embodiments of the present invention may operate on a mark-up language such as the extensible markup language (XML), although it should be understood that other mark-up languages may be equally used including for example, Standard Generalized Markup Language (SGML), Hypertext Markup Language (HTML) or the like.

According to one aspect of example embodiments of the present invention, an apparatus is provided that includes a processor and a memory storing executable instructions that in response to execution by the processor cause the apparatus to at least perform a number of operations. The operations include receiving a communication including an application protocol primitive that itself includes one or more protocol information elements (components of the application protocol primitive carrying information). The operations also include comparing the application protocol primitive to a protocol document type definition (DTD) (e.g., an augmented DTD) including a plurality of elements.

The DTD also includes one or more lawful interception attributes for one or more of the elements of the DTD, whereby the lawful interception attributes include a type of content and/or a level of interception. The application protocol primitive may therefore be received without any of its protocol information elements including any lawful interception attributes present in the communication. Related to augmenting the DTD, the operations may further include receiving a DTD including a plurality of elements, and augmenting the DTD to include one or more lawful interception attributes for one or more of the elements of the DTD. The type of content attribute may be selected from a group of types including content of communication, interception-related information or a combination of content of communication and interception-related information; and the level of interception may be selected from a group of levels representing different amounts of information to be transmitted to the interception monitoring facility.

The application protocol primitive is compared to the DTD to identify lawful interception attributes of one or more of the protocol information elements of the application protocol primitive of the communication, and one or more of the protocol information elements are prepared for transmission to an interception monitoring facility according to the lawful interception attributes of the respective protocol information element(s).

Each of the application protocol primitive and the DTD may be representable as a tree structure including a root node and one or more leaf nodes, where each leaf node represents a protocol information element. Comparing the application protocol primitive to a DTD may include locating a sub-tree structure within the DTD that corresponds to the tree structure of the application protocol primitive. For each of the protocol information element(s) of the application protocol primitive, then, the comparison may also include traversing the tree structure of the application protocol primitive from the root node to the leaf node representing the respective protocol information element. In addition, the comparison may include identifying, from the corresponding sub-tree structure within the DTD, any lawful interception attributes of the leaf node representing the respective protocol information element—and possibly any lawful interception attributes of the leaf node and any parent nodes of the leaf node. Even further, the comparison may include comparing the identified lawful interception attributes to a request for lawful interception of communications to determine whether the identified protocol information element satisfies the request. Any lawful interception attributes of the respective protocol information element, or more particularly for example any lawful interception attributes that satisfy the request for transmission, may be thereby identified. The identified lawful interception attributes may then be prepared for transmission.

BRIEF DESCRIPTION OF THE DRAWING(S)

Having thus described the invention in general terms, reference will now be made to the accompanying drawings, which are not necessarily drawn to scale, and wherein:

Figure 5:
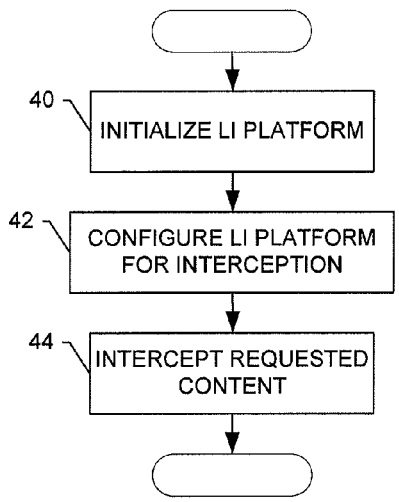

FIGS. 5, 6 (including 6a and 6b) and 7 are flowcharts including various operations in a method according to various example embodiments of the present invention; and FIG. 8 (including 8a and 8b) illustrates a protocol-augmented DTD tree and an example of a protocol primitive tree, according to various example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit, a server, a cellular network device, or other network device.

As indicated above in the Summary section, example embodiments of the present invention provide an apparatus, method and computer-readable storage medium for automatically determining application protocol elements as different types of lawful interception (LI) content. Example embodiments of the present invention may be described in the context of two different types of LI content, namely content of communication (CC) or interception-related information (IRI), but it should be understood that example embodiments of the present invention may be applied to any of a number of other types of LI content. Again, example embodiments of the present invention may be applicable to any of a number of different application protocols, such as any of a number of different email, messaging (e.g., SMS), instant messaging (IM), social-networking protocols or the like. Further, although example embodiments of the present invention may operate on a mark-up language such as the extensible markup language (XML), it should be understood that other mark-up languages may be equally used including for example, Standard Generalized Markup Language (SGML), Hypertext Markup Language (HTML) or the like.

Example embodiments of the present invention more particularly provide LI-attributes for addition to protocol information elements specified in XML to allow a LI platform to discriminate between the various types of LI information, such as CC and IRI. Before further describing example embodiments of the present invention, an introduction will be provided for a number of XML concepts and constructs that may be utilized. First, a set of XML-related documents may be formally defined with a so-called document type definition (DTD), which may define the grammar against which an XML document may be checked to decide whether the document is valid. As explained herein, an XML-related document may include a protocol message or one or more primitives of a protocol, which may be considered a unit of data of a protocol exchanged between two or more devices implementing the protocol and containing one or more protocol information elements. A protocol information element, in turn, may be considered an individual component of each protocol message or primitive carrying some meaningful and actionable information.

Second, an XML document may include of a number of elements each of which has a start tag and an end tag, and may further have optional content and/or attributes. Consider the following example 1 including the Status response Instant Messaging and Presence Services (IMPS) Client-Server protocol (CSP) primitive whereby <Transaction> is the start-and-end tag of an element and the content of this element is included between <Transaction> and </Transaction>. XML elements may be nested within other XML elements. As shown, the tag <TransactionDescriptor> is nested within <Transaction>. But at the lowest nesting level, an XML terminal element contains some legal values; for example, the value of the <TransactionID> element is a terminal element and has the value "IMApp01#12345@NOK5110."

```
<WV-CSP-Message xmlns="http://www.openmobilealliance.org/DTD/IMPS-CSP1.3">
    <Session>
        <SessionDescriptor>
            <SessionType>Inband</SessionType>
            <SessionID>im.user.com#48815@server.com</SessionID>
        </SessionDescriptor>
        <Transaction>
            <TransactionDescriptor>
                <TransactionMode>Response</TransactionMode>
                <TransactionID>IMApp01#12345@NOK5110</TransactionID>
            </TransactionDescriptor>
            <TransactionContent
xmlns="http://www.openmobilealliance.org/DTD/IMPS-TRC1.3">
                <Status>
                    <Result>
                        <Code>200</Code>
                    </Result>
                </Status>
            </TransactionContent>
        </Transaction>
        <Poll>F</Poll>
    </Session>
</WV-CSP-Message>
```

Example 1

An Instance of a Protocol Primitive Specified with XML

In addition, an element may have one or more attributes. The elements of example 1 do not have attributes. But example 2 below illustrates how the result code could have been formatted as an attribute of the Result element rather than as a nested element as in example 1.

```
<Result code="200">
</Result>
```

Example 2

Use of Attribute within an Element

With the preceding XML concepts and constructs in mind, example embodiments of the present invention may make use of a protocol XML DTD by augmenting the DTD with "LI-attributes". The following rules may define one manner by which LI-attributes are assigned to XML elements.

1. Each leaf element (an element with actual content rather than including other nested elements) of a protocol primitive may be assigned two optional LI-attributes defined in the DTD.

2. The LI-attributes of an element may be configured to not appear in the actual XML document like in example 2. To respect XML DTD rules, these attributes may be flagged as optional attributes and protocol developers may not be aware of them.

3. The first attribute may be called LI-Type and may take one of three possible values: CC, IRI or both IRI and CC (i.e., IRI+CC). Generally, the LI-Type attribute may take on a value for each of a plurality of different types of LI content, as well as any of a number of desired combinations of types of LI content.

4. The second attribute may be called LI-Level and may identify the "level" of interception. Depending on the law enforcement agency (LEA) case, a LEA may not need all the protocol elements sent and received by a user's device. Hence, ordered "interception levels" may represent different amounts of intercepted information to be provided to the LEA. In accordance with one example embodiment, two levels may be defined as "Basic" and "Comprehensive," or numerically as levels 1 and 2, although more levels may be defined as desired. The levels may be exclusive of one another, or according to one example embodiment, may be inclusive. That is, if level (I+1) is greater than level I, an interception requesting level (I+1) may also receive the information identified as levels I, (I−1), . . . 1.

5. LI-attributes may or may not be assigned to non-leaf elements. Assigning LI-attributes to a non-leaf element may allow its children leaf elements to inherit its attributes, if the children leaf elements were not assigned their own attributes. Thus, example embodiments of the present invention may make use of the concept of inheritance such that if an element is not assigned a LI-attribute it may inherit the attribute(s) assigned to its parent element.

Examples 3 and 4 below illustrate the above rules. Example 3 is a fragment of a CSP Send Message request primitive. It allows a user's device to send an instant message to another user's device via an appropriate server, gateway or the like. Example 3 is an XML document based on the DTD fragment shown as example 4.

```
<Transaction>
    <TransactionDescriptor>
        <TransactionMode>Request</TransactionMode>
        <TransactionID>IMApp01#12345@NOK5110</TransactionID>
    </TransactionDescriptor>
    <TransactionContent>
        <SendMessage-Request>
            <MessageInfo>
                <ContentType>text/plain</ContentType>
                <ContentSize>33</ContentSize>
                <Recipient>
                    <UserID>wv:he@there.com</UserID>
                </Recipient>
                <Sender>
                    <UserID>wv:john@smith.com</UserID>
                </Sender>
            </MessageInfo>
            <ContentData>Hurry up; we will miss the
            train<ContentData>
        </SendMessage-Request>
    </TransactionContent>
</Transaction>
```

Example 3

A Fragment of CSP Send Message Request Primitive

```
<!ELEMENT Transaction (TransactionDescriptor, TransactionContent)
<!ELEMENT TransactionDescriptor(TransactionMode, TransactionID)
<!ELEMENT TransactionMode (#PCDATA)>
<!ELEMENT TransactionID (#PCDATA)>
<!ELEMENT TransactionContent (Status |...| SendMessage-Request |...)>
<!ELEMENT SendMessage-Request(MessageInfo, ContentData)>
<!ELEMENT MessageInfo (ContentType, ContentSize,Recipient,Sender)>
<!ELEMENT ContentData (#PCDATA)>
<!ELEMENT ContentType (#PCDATA)>
<!ELEMENT ContentSize (#PCDATA)>
<!ELEMENT Sender (UserID)>
<!ELEMENT Recipient (UserID)>
<!ELEMENT UserID (#PCDATA)>
```

Example 4

The DTD of Example 3

Figure 3:
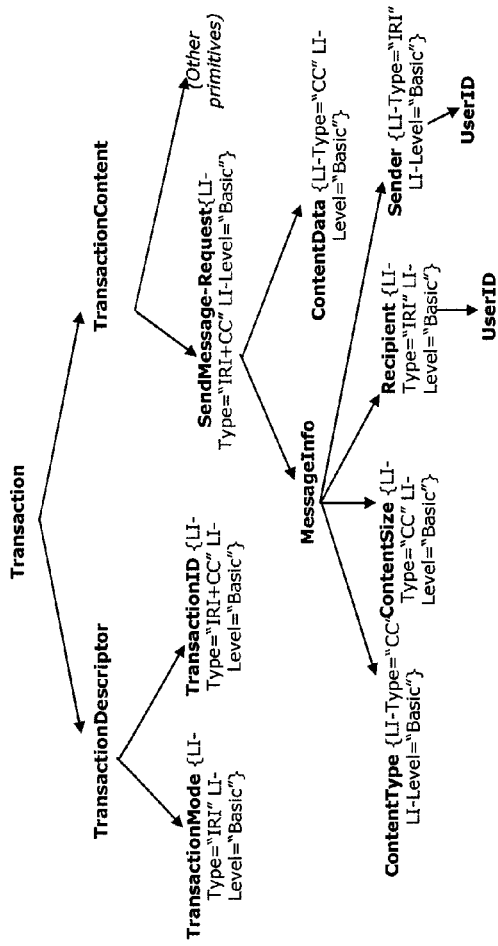
FIG. 3 illustrates an example of a tree-like structure of a partial protocol-augmented document type definition (DTD), according to various example embodiments of the present invention.

The DTD of Example 4 allows an XML parser to decide whether the XML document of FIG. 3 is valid, such as if the document follows the structure of the DTD. If the document is valid, its contents may be further processed; otherwise, if the document is not valid, processing of the document may cease.

LI-attributes may be specified in an XML DTD in any of a number of different manners. In this regard, example 5 shows the DTD of example 4 but augmented with LI-attributes. FIG. 3 illustrates the tree structure of the DTD of example 5. As shown in example 5, the syntax of the attribute declaration may be as follows. An attribute may be announced by a keyword, such as "!ATTLIST." The next string may be the element tag name such as, for example, ContentSize. The element tag name may be followed by an attribute name and its value; for example, "Li-Type="CC"" or a list of attribute declaration. Finally, a keyword such as "IMPLIED" may be added as an XML DTD construct to indicate that the attribute is optional and does not have to appear in an actual XML document such as the document of example 3.

```
<!ELEMENT Transaction (TransactionDescriptor, TransactionContent)
<!ELEMENT TransactionDescriptor(TransactionMode, TransactionID)
<!ELEMENT TransactionMode (#PCDATA)>
<!ATTLIST TransactionMode LI-Type="IRI" #IMPLIED
          LI-Level="Basic" =IMPLIED>
<!ELEMENT TransactionID (#PCDATA)>
<!ATTLIST TransactionID LI-Type="IRI+CC" #IMPLIED
          LI-Level="Basic" =IMPLIED>
<!ELEMENT TransactionContent (Status |...| SendMessage-Request |...)>
<!ELEMENT SendMessage-Request(MessageInfo, ContentData)>
<!ATTLIST SendMessage-Request LI-Type="IRI+CC" #IMPLIED
          LI-Level="Basic" =IMPLIED>
<!ELEMENT MessageInfo (ContentType, ContentSize,Recipient,Sender)>
<!ELEMENT ContentData (#PCDATA)>
<!ATTLIST ContentData LI-Type="CC" #IMPLIED
          LI-Level="Basic" =IMPLIED>
<!ELEMENT ContentType (#PCDATA)>
<!ATTLIST ContentType LI-Type="CC" #IMPLIED
          LI-Level="Basic" =IMPLIED>
<!ELEMENT ContentSize (#PCDATA)>
<!ATTLIST ContentSize LI-Type="CC" #IMPLIED
          LI-Level="Basic" =IMPLIED>
<!ELEMENT Sender (UserID)>
<!ATTLIST Sender LI-Type="IRI" #IMPLIED
          LI-Level="Basic" =IMPLIED>
<!ELEMENT Recipient (UserID)>
```

```
<!ATTLIST Receiver LI-Type="IRI" #IMPLIED
    LI-Level="Basic" =IMPLIED>
<!ELEMENT UserID (#PCDATA)>
```

Example 5

DTD of Example 4 with LI-Attributes

It is noted that the DTD of example 5 is a special DTD (referred to herein as a "protocol-augmented DTD") that may not be used by software developers who are implementing the protocol. Protocol implementers may instead use the DTD of example 4. On the other hand, LI specialists may create and use the DTD of example 5. Table 1 below further explains the LI changes made in example 5.

TABLE 1

Example 5 LI revision explanations

| Element | Explanation |
|---|---|
| Transaction | By design, it may be that no LI-attributes are assigned to this element. It is a non-leaf element and it is not required to assign LI-attribute to non-leaf element (rule 5) and in this case it may not be useful. |
| TransactionDescriptor | See the Transaction explanation. |
| TransactionMode | This is a leaf element. It may be assigned the type "IRI" and the level "basic." |
| TransactionID | This element may be assigned the type (IRI + CC) because the transaction ID may appear in both IRI and CC records sent to the LEA. The transaction ID may facilitate correlation of the two types of LI records. The level may also be basic. |
| TransactionContent | See the Transaction explanation. |
| SendMessage-Request | This is the name of the primitive. It may appear in both IRI and CC records, and may therefore be assigned the LI-type (IRI + CC) with the level of basic. |
| MessageInfo | See the Transaction explanation. |
| ContentType | This element contains information about the content of the communication (e.g., ContentData) and may be part of the CC record rather than the IRI record to be sent to the LEA. |
| ContentSize, | See the ContentType explanation. |
| Recipient | This element may be classified as IRI and be accordingly assigned a LI-type and level. |
| Sender | See the Recipient explanation. |
| UserID | This element may inherit the LI-attributes of its parent element. |
| ContentData | This element may include CC information, and may therefore be assigned the LI-type of CC and have the basic level. |

For the above example 5, all of the elements may be considered basic elements. However, in a protocol such as CSP there are hundreds of elements and not all of them are essential to the LEA. Therefore some of the possible elements may instead be assigned a LI-level such as "Comprehensive."

In the above, the LI-attributes may be stored as DTD attributes of the leaf nodes. As an alternative, the LI-attributes may be stored in a separate table structure, as provided in the below Table 2. The structure of Table 2 may be manually created when the LI platform is designed. Each row of Table 2 may include the LI attributes of a node. The last column of each row indicates the parent node of the node listed in the first column. The parent nodes allow the LI platform to recreate the DTD tree structure of FIG. 3; in particular to support the concept of LI attributes inheritance. Basically, the parent node in the last column may be a pointer to another row of the table. For example, the node UserID may not be assigned LI attributes. However, the UserID parent node may be either the Sender or Receiver node depending on the message tree branch of FIG. 4 being analyzed. Therefore, the LI platform may check the Sender or Receiver node to locate its LI attributes. If a parent node is not assigned LI attributes, the process may be repeated until a parent node is found with LI attributes assigned to it that its descendant nodes will inherit.

TABLE 2

Storage of the LI-attributes in a separate table structure

| Node | LI-Type | LI-Level | Parent node |
|---|---|---|---|
| Leaf node | | | |
| TransactionMode | IRI | Basic | TransactionDescriptor |
| TransactionID | IRI + CC | Basic | TransactionDescriptor |
| ContentType | CC | Basic | MessageInfo |
| ContentSize | CC | Basic | MessageInfo |
| UserID | — | — | Recipient or Sender |

TABLE 2-continued

Storage of the LI-attributes in a separate table structure

| Node | LI-Type | LI-Level | Parent node |
|---|---|---|---|
| ContentData | CC | Basic | SendMessage-Request |
| Non-leaf node | | | |
| TransactionDescriptor | — | — | Transaction |
| TransactionContent | — | — | Transaction |
| MessageInfo | — | — | SendMessage-request |
| SendMessage-request | IRI + CC | Basic | TransactionContent |
| Recipient | IRI | Basic | MessageInfo |
| Sender | IRI | Basic | MessageInfo |
| Transaction | — | — | "None" |

In accordance with example embodiments of the present invention, a protocol element may be assigned the LI-attribute type of CC or IRI, or both CC and IRI in any of a number of different manners. Generally, Content of Communication (CC) includes information exchanged between two or more user devices of a telecommunication service, excluding Intercept Related Information (IRI)—and may include information that may be stored by one user device for subsequent retrieval by another user device as part of some telecommunication service.

Intercept Related Information, on the other hand, may generally include the collection of information or data associated with telecommunication services involving a target identity. More specifically, Intercept Related Information may include communication associated information or data (including unsuccessful communication attempts), service associated information or data (e.g., service profile management by subscriber), location information or the like. As used herein, a target identity may be an identifier that uniquely identifies an interception subject (e.g., a person whose telecommunication activities are to be intercepted). Examples of target identities are Mobile Station International Subscriber Directory Number (MSISDN), International Mobile Subscriber Identity (IMSI), International Mobile Equipment Identity (IMEI), Internet identities (e.g. IM, email or social networking identities) or the like.

With the preceding definitions of Content of Communication and Intercept Related Information in mind, the following criteria may be used to decide whether to tag an application protocol element as IRI or CC (or both):

1. Protocol information elements exchanged between users (via a network server/gateway) may be assigned the type CC;

2. Protocol information elements created by a user and used for the user's communication with another user may be assigned the type CC;

3. Protocol information elements carrying system messages (or replies to system messages) such as "terms of use" or "advice on charging" may be assigned the type CC;

4. When an information element has to appear in both an IRI and a CC record, it may be assigned both LI types (IRI and CC); and 5. All other information elements may be assigned the type IRI.

More particularly, for example, protocol information elements exchanged between users, which may be assigned the type CC, may include one or more of the following: (a) protocol information elements carrying messages created by one user and addressed to one or more other users; (b) protocol information elements carrying presence attributes created by one user or the server/gateway and accessible to other authorized users; (c) protocol information elements carrying a user's profile and accessible to other users; and/or (d) protocol information elements carrying lists of messages.

Protocol information elements created by a user and used for the user's communication with another user, which may be assigned the type CC, may include one or more of the following for example: (a) protocol information elements carrying contact lists or address books created by one user and used for the user's communication with other users; (b) protocol information elements carrying white or black lists granting or denying other users the possibility to communicate with the owner of the white or black list; (c) protocol information elements carrying presence authorization list allowing users to have access to presence attributes of the owner of the authorization list; and/or (d) protocol information elements carrying chat rooms management information.

Under the aforementioned third criteria (e.g., protocol information elements carrying system messages) there may be, for example, information elements carrying messages from the network operator or service provider to the user and the user responses. These messages may be referred to as "system messages," and as indicated above, they may be assigned the LI-type CC.

Figure 1:
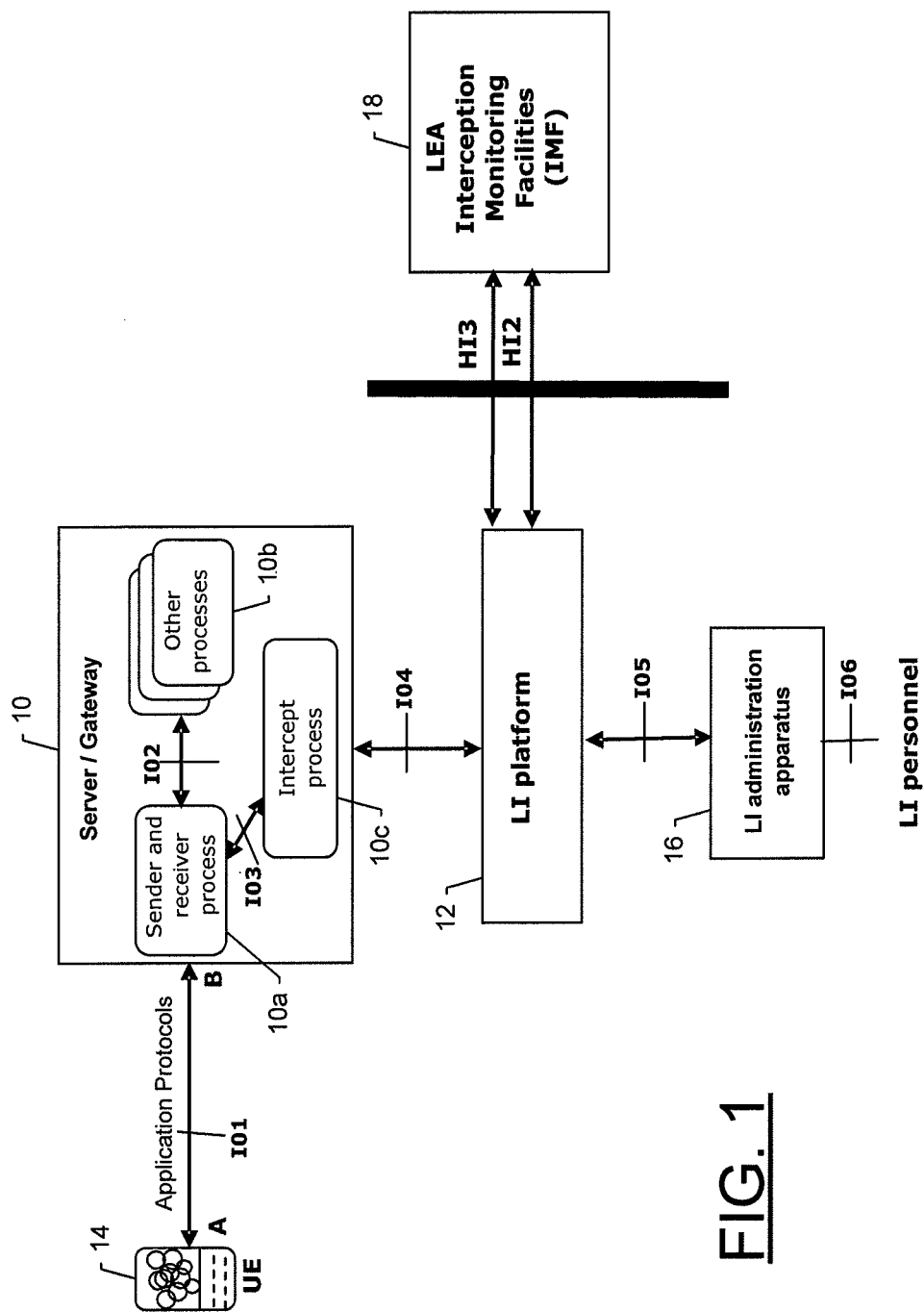
FIG. 1 illustrates a network architecture according to various example embodiments of the present invention.

Reference is now made to FIG. 1, which depicts a network architecture according to various example embodiments of the present invention. As shown, the network architecture includes one or more network servers, gateways 10 or the like, as well as an LI platform 12, which may be configured to operate within one or more core networks or other data or communication networks. The network server, gateway or the like (sometimes generally referred to herein as either a server or a gateway) and the LI platform may generally be accessible by devices or facilities including devices configured to communicate across one or more access networks. These devices or facilities may include, for example, one or more user equipment (UE) 14, LI administration apparatus 16 and/or LEA interception monitoring facilities 18 (IMF). Examples of access networks by which these devices (including those of the facilities) may connect to the server/gateway and/or LI platform include 3GPP radio access, UMTS radio access UTRAN (Universal Terrestrial Radio Access Network), GSM radio access, Code Division Multiple Access (CDMA) 2000 radio access, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP access networks may include, for example, 3G or 3.9G (also referred to as UTRAN Long Term Evolution (LTE) or Super 3G) or E-UTRAN (Evolved UTRAN). Generally, an access network may refer to any 2G, 3G, 4G or higher generation mobile communication technology and their different versions, as well as to any other wireless radio access technology that may be arranged to interwork with such a mobile communication technology.

Generally, the server/gateway 10 is configured to facilitate the transmission and/or reception of communication to and/or from UEs 14 (also or varyingly known as terminal equipment, mobile terminals, mobile stations or the like) over an interface 101. As shown in FIG. 1, and as explained more fully below, the server/gateway may internally be configured to implement a number of processes including, for example, a sender and receiver process 10a that may be configured to interact with other process(es) 10b over an interface 102, and/or with an intercept process 10c over an interface 103.

According to example embodiments of the present invention, a UE 14 may be a any of a number of suitable devices for carrying out functions of example embodiments of the present invention, including for example a mobile computer, mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like.

In addition to facilitating communication to/from UEs 14, the server/gateway 10 may also be configured to communicate with a LI platform 12 over an interface 104 for interception of various communications to/from various UEs. The LI platform may be configured to communicate with an LI administrator apparatus 16 (e.g., personal computer) over an interface 105 to permit LI personnel to interact with the LI platform. More particularly, the LI platform 12 may support a graphical interface by which LI personnel may manage LI activities from the LI administration apparatus 16 over an interface 106. The LI administration apparatus may then accordingly interact with the LI platform.

To carry out various ones of its functions, the LI platform 12 may be further configured to interact with the server/gateway 10 to implement interception measures including, for example, the creation, activation, modification and/or deactivation of interception instructions regarding one or more target identities. The LI platform may also be configured to receive intercepted messages from the server/gateway, and communicate various ones of those messages to one or more LEA IMFs 18. For example, the LI platform may be configured to parse and analyze intercepted messages according to their protocol-augmented DTD to decide which protocol information elements to keep and whether they are of type IRI or CC. The LI platform may then be configured to format the information to send to the LEA IMF. As shown, the LI platform may be configured to send the LI information to the LEA IMF over handover interface (HI) ports, such as by receiving CC information over a HI2 port and receiving IRI information over a HI3 port.

Figure 2:
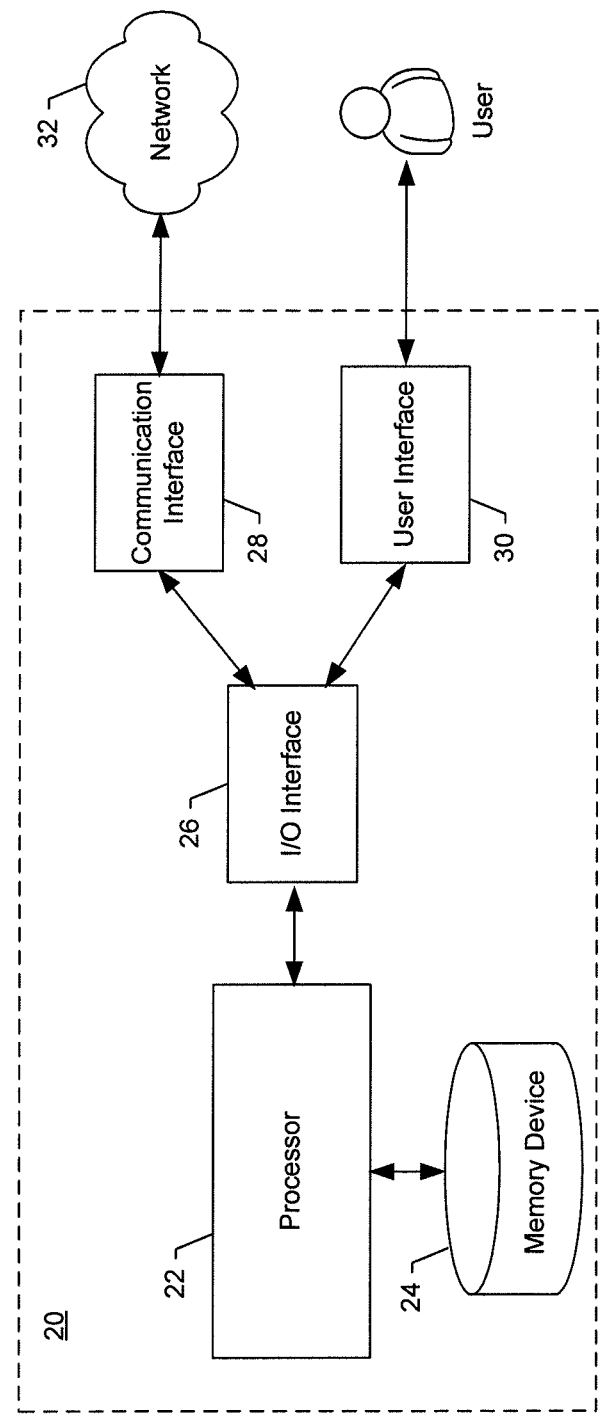
FIG. 2 illustrates an apparatus that may be configured to operate within the network architecture of FIG. 1, according to various example embodiments of the present invention.

Reference is now made to FIG. 2, which illustrates an apparatus 20 according to example embodiments of the present invention configured to perform the various functionalities described herein. As shown and described herein, the example apparatus may be configured to function as or otherwise implement one or more of the network components depicted in FIG. 1 (e.g., server/gateway 10, LI platform 12, UE 14, LI administration apparatus 16, LEA IMF 18). The example apparatus depicted in FIG. 2 may also be configured to perform example methods of the present invention, such as those described with respect to FIGS. 5, 6 and/or 7.

In some example embodiments, the apparatus 20 may be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 22, memory devices 24, Input/Output (I/O) interfaces 26, communications interfaces 28 and/or user interfaces 30 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 22 may be an entity capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 24 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 22.

Further, the memory device 24 may be configured to store information, data, applications, computer-readable program code instructions, and/or the like for enabling the processor 22 and the example apparatus 20 to carry out various functions in accordance with example embodiments of the present invention described herein. For example, the memory device could be configured to buffer input data for processing by the processor. Additionally, or alternatively, the memory device may be configured to store instructions for execution by the processor.

The I/O interface 26 may be any device, circuitry, or means embodied in hardware, software or a combination of hardware and software that is configured to interface the processor 22 with other circuitry or devices, such as the communications interface 28 and/or the user interface 30. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 20 to perform, various functionalities of embodiments of the present invention.

The communication interface 28 may be any device or means embodied in hardware, software or a combination of hardware and software that is configured to receive and/or transmit data from/to one or more networks 32 (e.g., access networks, core networks and/or other data or communication networks) and/or any other device or module in communication with the example apparatus 20. The processor 22 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 28 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), infrared (IrDA) or any of a number of different wireless networking techniques. The communications interface may also be configured to support communications at the network layer, possibly via Internet Protocol (IP).

The user interface 30 may be in communication with the processor 22 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 24). In some example embodiments, the user interface circuitry is configured to facilitate user control of at least some functions of the apparatus 20 through the use of a display and configured to respond to user inputs. The processor may also comprise, or be in communication with, display circuitry configured to display at least a portion of a user interface, the display and the display circuitry configured to facilitate user control of at least some functions of the apparatus.

Referring now to FIG. 5, the LI platform 12 may be configured to operate in three phases. In the first phase, the LI platform may be initialized and its operation started up, as shown in block 40. In the second phase, the LI platform may be normally operated to configure it for a new interception (sometimes referred to as a request or LI request), as shown in block 42. And in the third phase, the LI platform may be normally operated when an intercepted subject (see definition) becomes active and that subject's traffic is intercepted, as shown in block 44. Each of these phases will now be described below.

In the first phase, during the initialization of the LI platform, the platform may create or otherwise receive a DTD tree structure similar to that of FIG. 3 augmented with LI-attributes of one or more application protocols the LI platform is configured to process for interception. The protocol-augmented DTD tree may include a node for each application protocol element, and each node may include any of a number of different pieces of information. For example, a node may include one or more of the respective element's name (e.g., TransactionID, Receiver, MessageInfo), the type of content for leaf nodes (e.g., integer string, image), a link to any of the node's children nodes, a list of any attributes of the node, or the LI-attributes and their values: LI-Type and/or LI-Level.

Once created or received, the protocol-augmented DTD tree enables the LI platform to decide (a) whether to keep an element or discard it depending on the LEA requested level of interception, and/or (b) whether an element is of the CC or IRI type. Thus, once initialization of the LI platform is complete, the LI platform may be ready for operation.

In the second phase, to configure the LI platform 12 for an interception, LI personnel may enter a number of different configuration data into the LI administration apparatus 16 to setup an interception (sometimes referred to as an LI request). This configuration data may include, for example, an interception identification such as the court warrant document identification authorizing a LEA to perform the interception of the telecommunication activities of an individual (i.e., interception subject), and an identification of the interception subject. The identification of the interception subject, which may be referred to as the "target identity," may include for example, the mobile station international subscriber directory number (MSISDN), international mobile subscriber identity (IMSI), international mobile equipment identity (IMEI) or an Internet identity such as an email, IM or social networking user ID. Also, for example, the configuration data may include a start and end date (or duration) for the interception—with a possible start date of "now" indicating an immediate start of the interception. The configuration data may indicate the type of intercepted information to be provided (CC, IRI or both) and the interception level, and/or any required network information such as IP addresses and port numbers for sending the CC and/or the IRI to the LEA IMF 18. In this regard, the configuration data may further include the delivery mechanism(s) to be used for the HI2 and HI3 (e.g., file transfer, email attachment or over HTTP, etc.) and/or the frequency of delivery of the intercepted information; and may include information for a particular contact within the LEA.

Once or as the LI administration apparatus 16 receives the configuration data, the respective data may be uploaded or otherwise transmitted to the LI platform 12, which may in turn upload or otherwise transmit the data to the server/gateway 10 as an LI request. On receipt of such an LI request, the server/gateway may begin interception of the requested content.

Figure 6A:
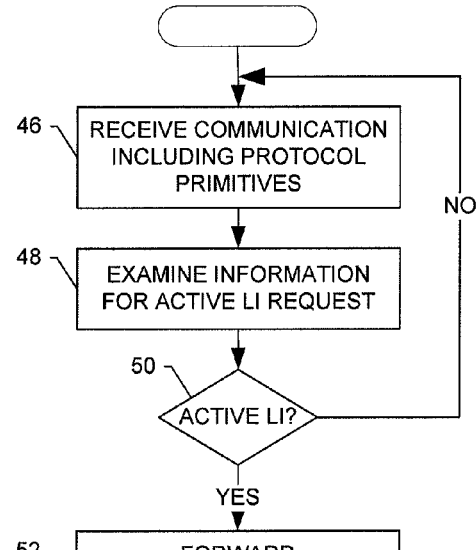
Figure 6B:
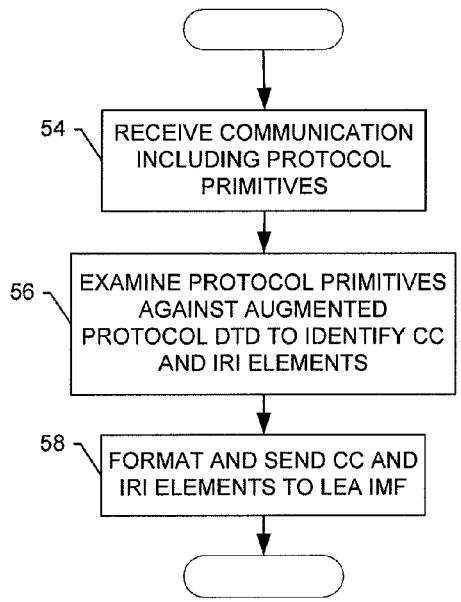

Referring to FIGS. 6a and 6b, in the third phase, the interception process may include the intercept process 10c of the server/gateway 10 receiving a communication including protocol primitives from the sender and receiver process 10a of the server/gateway, as shown in block 46. The information received by the intercept process may include information received by the sender and receiver process from a UE 14 and/or other processes 10b on interfaces 101 and/or 102. The intercept process may then examine the communication to determine whether it belongs to an active LI request, such as by comparing an identification in the communication with the identification(s) of its interception subject(s) (e.g., MSISDN, IMSI, IMEI, email address, IM or social networking user ID, etc.), as shown in blocks 48 and 50. Then, if the intercept process determines that the communication does belong to an active LI communication, the intercept process forwards the communication to the LI platform 12 over interface 104, as shown in block 52.

The LI platform 12 may receive the communication for an active LI from the server/gateway 10, such as in an agreed protocol format between the server/gateway and the LI platform (e.g., XML format), as shown in block 54. The LI platform may then compare the communication's protocol primitives to an appropriate LI augmented protocol DTD to determine any protocol elements that are CC, IRI or both, as well as to determine the elements are of a requested LI-Level, as shown in block 56. The LI platform may then format and send those elements of the requested LI-Level to the LEA IMF 18 over the appropriate interface(s) (e.g., CC over HI2, IRI over HI3, or CC+IRI over both HI2 and HI3).

Figure 4:
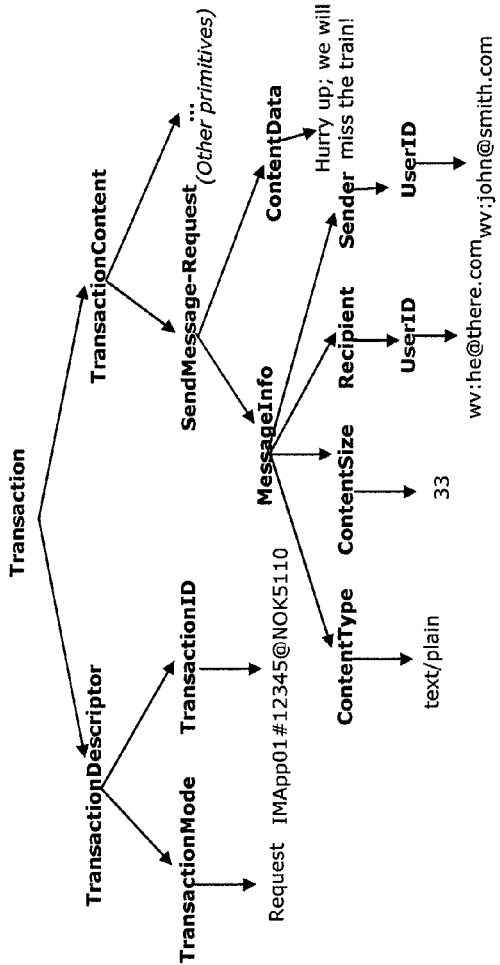
FIG. 4 illustrates an example of a partial protocol primitive derived from the DTD of FIG. 3, according to various example embodiments of the present invention.
Figure 7:
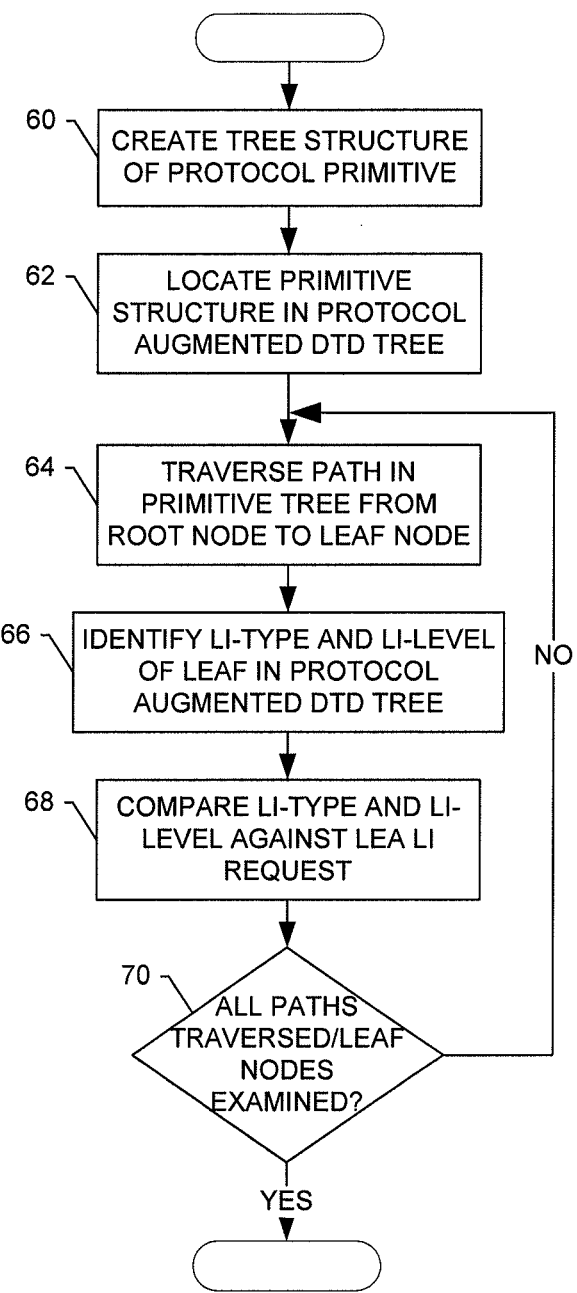

The LI platform 12 may examine a protocol primitive in a number of different manners as a function of not only the protocol primitive, but also the tree structure of the augmented protocol DTD with LI-attributes (LI-Type and LI-Level, and the configuration data for one or more LI requests. One example method by which the LI platform may examine a protocol primitive is illustrated in FIG. 7. As shown in block 60, the method of this example embodiment of the present invention includes the LI platform creating a tree structure of the received protocol primitive. One example of such a tree structure of a protocol primitive is shown in FIG. 4. The leaf nodes of the tree structure include the content of the primitive such as, for example, UserID, content data and/or content size. The higher nodes of the primitive tree reflect the hierarchical structure of the primitive.

Figure 8B:
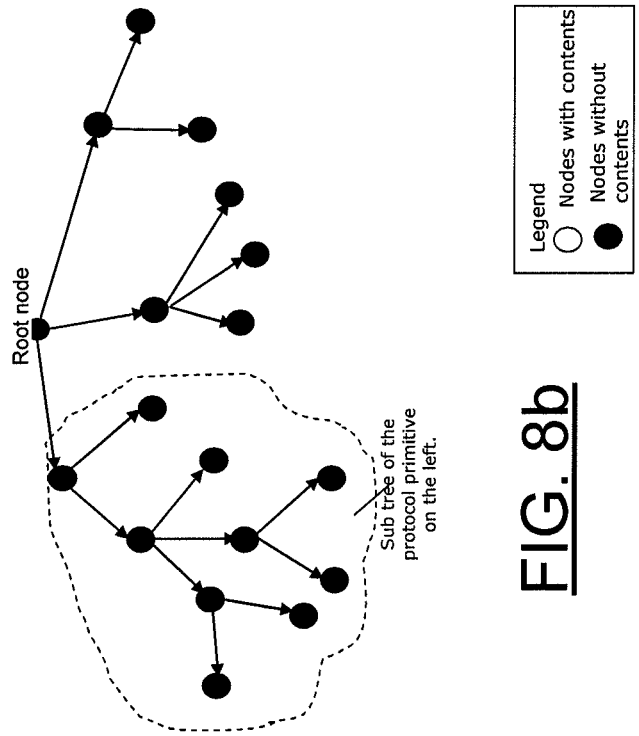
Figure 8A:
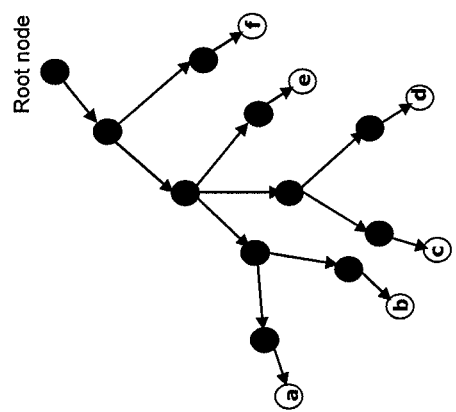

As shown in block 62 of FIG. 7, after creating the tree structure of the protocol primitive, the LI platform 12 may locate the primitive structure in the appropriate protocol-augmented DTD tree (created or received during initialization of the LI platform—see FIG. 5, block 40). As the protocol-augmented DTD tree may include all of the primitive structures, the LI platform may locate the DTD sub-tree that corresponds to the received primitive. FIG. 8a illustrates an example tree structure of a protocol primitive, and FIG. 8b illustrates an example protocol-augmented DTD tree in which the circled sub-tree corresponds to the primitive shown on FIG. 8a. The leaf nodes of FIG. 8a may include the actual content of the primitive.

After locating the primitive structure in the appropriate protocol-augmented DTD tree, the LI platform 12 may traverse a path in the primitive tree from a root node to a leaf node, as shown in block 64. FIG. 8a illustrates an example whereby the LI platform may traverse the path from the root node to the leaf node with content "a" (and similarly to the leaf nodes with content "b," "c," "d," "e" and "f"). At the leaf node, the LI platform may identify, from the corresponding sub-tree of the protocol-augmented DTD tree, any LI-attributes (LI-Type and LI-Level) associated with the respective leaf node, and may further identify any LI-attributes associated with a parent node of the leaf node since the leaf node may inherit the attributes of its parent, as shown in block 66.

After identifying the LI-attributes of a leaf node, the LI platform 12 may check or otherwise compare the LI-Type and LI-Level to the configuration data for the appropriate LI request to determine whether to keep or discard the leaf node (representing a piece of the primitive content), and hence whether the leaf node satisfies the request, as shown in block 68. More particularly, for example, if the LI request only requires CC content, the LI platform may keep the leaf node if the node LI-Type is CC or both IRI and CC; otherwise, the LI platform may discard the leaf node. The following Table 3 summarizes the decisions that may be made by the LI platform according to the requirements of the LI request.

TABLE 3

|  |  | Configuration data - Interception Type | | |
|---|---|---|---|---|
|  |  | IRI | CC | IRI + CC |
| Node LI-Type | IRI | Keep | Discard | Keep |
|  | CC | Discard | Keep | Keep |
|  | IRI + CC | Keep | Keep | Keep |

If after checking or otherwise comparing the LI-Type, the LI platform 12 keeps the leaf node, the LI platform may similarly check or compare the LI-Level to the configuration data for the appropriate LI request to determine whether to keep or discard the leaf node. For example, if the configuration data of the LI request indicates to keep only elements having the LI-Level of basic, the LI platform may keep those elements and discard other elements having the LI-Level of comprehensive. This decision is summarized in the following Table 4.

TABLE 4

|  |  | Configuration data - Interception Level | |
|---|---|---|---|
|  |  | Basic | Comprehensive |
| Node LI-Level | Basic | Keep | Keep |
|  | Comprehensive | Discard | Keep |

After the LI platform 12 checks or otherwise compares the LI-attributes to the LI request, the LI platform may repeat the process for any remaining leaf nodes. That is, the LI platform may repeat the process of traversing a path to a leaf node, identifying the LI-attributes and comparing those attributes to the configuration data, as shown at block 70 and again in blocks 64, 66 and 68. At the conclusion, the LI platform may have one or more leaf nodes that have been kept, and these leaf nodes may be formatted and sent as CC and IRI elements to the LEA IMF 18 (see FIG. 6b, block 58).

As explained above, the network architecture includes a separate LI platform 12 that, along with the intercept process 10c of the server/gateway 10, processes LI requests to effectuate lawful interception of communications. It should be understood, however, that various functions of the intercept process of the server/gateway may instead be performed by the LI platform, or that various functions of the LI platform may instead be performed by the intercept process of the server/gateway. Thus, in some example embodiments, the network architecture need not include a separate LI platform (or that the server/gateway may be said to be configured to implement the LI platform), or hence the interface 104 between the server/gateway and the LI platform.

According to one aspect of the example embodiments of present invention, the functions performed by the apparatus 20, such as those illustrated by FIGS. 5, 6 and/or 7, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 24 of the example apparatus, and executed by a processor, such as the processor 22 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowchart's block(s) or operation(s).

Accordingly, execution of instructions associated with the blocks or operations of the flowchart by a processor, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:

intercepting a communication from a sender to a receiver, the communication being formatted in a structured mark-up language, the mark-up language including at least one protocol primitive for an application that sends and receives communications, each protocol primitive including one or more protocol information elements that carry information about a communication, each protocol information element including lawful interception (LI) attributes that include at least one of a type of content and a level of interception;

comparing a protocol primitive in the intercepted communication with a document type definition (DTD) for the mark-up language, to identify the LI attributes of the protocol information elements in the intercepted communication, the DTD specifying the LI attributes of the protocol information elements; and preparing one or more of the protocol information elements in the intercepted communication for transmission to an interception monitoring facility according to the LI attributes of the protocol information elements.

2. The apparatus of claim 1, wherein the intercepted communication includes a protocol primitive including protocol information elements without LI attributes.

3. The apparatus of claim 1, wherein the executable instructions cause the apparatus to further perform the following:

receiving a preliminary DTD including the protocol information elements of the mark-up language, without their LI attributes; and augmenting the preliminary DTD to include the LI attributes of the protocol information elements, wherein the LI attributes include (i) a type of content selected from a group of types including content of communication, interception-related information, and a combination of content of communication and interception-related information, and (ii) a level of interception selected from a group of levels representing different amounts of information to be transmitted to the interception monitoring facility.

4. The apparatus of claim 1, wherein each protocol primitive in the intercepted communication, and the DTD, is representable as a tree structure including a root node and one or more leaf nodes, each leaf node representing a protocol information element, wherein comparing a protocol primitive in the intercepted communication with the DTD comprises:

locating a sub-tree structure within the DTD that corresponds to the tree structure of the protocol primitive; and for each of the one or more protocol information elements of the protocol primitive, traversing the tree structure of the protocol primitive from the root node to the leaf node representing the protocol information element; and identifying, from the corresponding sub-tree structure within the DTD, the LI attributes of the leaf node representing the protocol information element to thereby identify the LI attributes of the respective protocol information element.

5. The apparatus of claim 4, wherein comparing a protocol primitive in the intercepted communication with the DTD comprises, for each of the one or more protocol information elements of the protocol primitive, determining whether the LI attributes of the protocol information element satisfy conditions of a pre-designated LI request, and wherein preparing one or more of the protocol information elements in the intercepted communication for transmission comprises preparing the protocol information elements whose LI attributes satisfy the conditions of the LI request for transmission.

6. The apparatus of claim 4, wherein identifying the LI attributes of the leaf node comprises identifying the LI attributes of the leaf node and of any parent nodes of the leaf node.

7. A method comprising:
   intercepting a communication from a sender to a receiver, the communication being formatted in a structured mark-up language, the mark-up language including at least one protocol primitive for an application that sends and receives communications, each protocol primitive including one or more protocol information elements that carry information about a communication, each protocol information element including lawful interception (LI) attributes that include at least one of a type of content and a level of interception;
   comparing a protocol primitive in the intercepted communication with a protocol document type definition (DTD) for the mark-up language, to identify the LI attributes of the protocol information elements in the intercepted communication, the DTD specifying the LI attributes of the protocol information elements; and
   preparing one or more of the protocol information elements in the intercepted communication for transmission to an interception monitoring facility according to the lawful interception LI attributes of the protocol information elements,
   wherein intercepting a communication, comparing the protocol primitive and preparing one or more of the protocol information elements are performed by a processor configured to intercept the communication, compare the protocol primitive and prepare the one or more of the protocol information elements.

8. The method of claim 7, wherein the intercepted communication includes a protocol primitive including protocol information elements without LI attributes.

9. The method of claim 7 further comprising:
   receiving a preliminary DTD including the protocol information elements of the mark-up language, without their LI attributes; and
   augmenting the preliminary DTD to include the LI attributes of the protocol information elements, wherein the LI attributes include (i) a type of content selected from a group of types including content of communication, interception-related information, and a combination of content of communication and interception-related information, and (ii) a level of interception selected from a group of levels representing different amounts of information to be transmitted to the interception monitoring facility.

10. The method of claim 7, wherein each protocol primitive in the intercepted communication, and the DTD, is representable as a tree structure including a root node and one or more leaf nodes, each leaf node representing a protocol information element, wherein comparing a protocol primitive in the intercepted communication with the DTD comprises:
   locating a sub-tree structure within the DTD that corresponds to the tree structure of the protocol primitive; and
   for each of the one or more protocol information elements of the protocol primitive,
      traversing the tree structure of the protocol primitive from the root node to the leaf node representing the protocol information element; and
      identifying, from the corresponding sub-tree structure within the DTD, the LI attributes of the leaf node representing the protocol information element to thereby identify the LI attributes of the protocol information element.

11. The method of claim 10, wherein comparing a protocol primitive in the intercepted communication with the DTD comprises, for each of the one or more protocol information elements of the protocol primitive, determining whether the LI attributes of the protocol information element satisfy conditions of a pre-designated LI request, and wherein preparing one or more of the protocol information elements in the intercepted communication for transmission comprises preparing the protocol information elements whose LI attributes satisfy the conditions of the LI request for transmission.

12. The method of claim 10, wherein identifying the LI attributes of the leaf node comprises identifying LI attributes of the leaf node and of any parent nodes of the leaf node.

13. A non-transitory computer-readable storage medium having computer-readable program code portions stored therein that in response to execution by a processor, cause an apparatus to at least perform the following:
   intercepting a communication from a sender to a receiver, the communication being formatted in a structured mark-up language, the mark-up language including at least one protocol primitive for an application that sends and receives communications, each protocol primitive including one or more protocol information elements that carry information about a communication, each protocol information element including lawful interception (LI) attributes that include at least one of a type of content and a level of interception;
   comparing a protocol primitive in the intercepted communication with a document type definition (DTD) for the markup language, to identify the LI attributes of the protocol information elements in the intercepted communication, the DTD specifying the LI attributes of the protocol information elements; and
   preparing one or more of the protocol information elements in the intercepted communication for transmission to an interception monitoring facility according to the LI attributes of the protocol information elements.

14. The non-transitory computer-readable storage medium of claim 13, wherein the intercepted communication includes a protocol primitive including protocol information elements without LI attributes.

15. The non-transitory computer-readable storage medium of claim 13, wherein the program code portions stored therein cause the apparatus to further perform the following:
   receiving a preliminary DTD including the protocol information elements of the mark-up language, without their LI attributes; and
   augmenting the preliminary DTD to include the LI attributes for one or more of the of the protocol information elements, wherein the LI attributes include (i) a type of content selected from a group of types including content of communication, interception-related information, and a combination of content of communication and interception-related information, and (ii) a level of interception selected from a group of levels representing different amounts of information to be transmitted to the interception monitoring facility.

16. The non-transitory computer-readable storage medium of claim 13, wherein each protocol primitive in the intercepted communication, and the DTD, is representable as a tree structure including a root node and one or more leaf nodes, each leaf node representing a protocol information element, wherein comparing a protocol primitive in the intercepted communication with the DTD comprises:
   locating a sub-tree structure within the DTD that corresponds to the tree structure of the protocol primitive; and
   for each of the one or more protocol information elements of the protocol primitive,
      traversing the tree structure of the protocol primitive from the root node to the leaf node representing the protocol information element; and identifying, from the corresponding sub-tree structure within the DTD, the LI attributes of the leaf node representing the protocol information element to thereby identify the LI attributes of the respective protocol information element.

17. The non-transitory computer-readable storage medium of claim 16, wherein comparing a protocol primitive in the intercepted communication with the DTD comprises, for each of the one or more protocol information elements of the protocol primitive, determining whether the LI attributes of the protocol information element satisfy conditions of a pre-designated LI request, and wherein preparing one or more of the protocol information elements in the intercepted communication for transmission comprises preparing the protocol information elements whose LI attributes satisfy the conditions of the LI request for transmission.

18. The non-transitory computer-readable storage medium of claim 16, wherein identifying the LI attributes of the leaf node comprises identifying the LI attributes of the leaf node and of any parent nodes of the leaf node.

19. An apparatus comprising:
- a first means for intercepting a communication from a sender to a receiver, the communication being formatted in a structured mark-up language, the mark-up language including at least one protocol primitive for an application that sends and receives communications, each protocol primitive including one or more protocol information elements that carry information about a communication, each protocol information element including lawful interception (LI) attributes that include at least one of a type of content and a level of interception;
- a second means for comparing a protocol primitive in the intercepted communication with a document type definition (DTD) for the mark-up language, to identify the LI attributes of the protocol information elements in the intercepted communication, the DTD specifying the LI attributes of the protocol information elements; and
- a third means for preparing one or more of the protocol information elements in the intercepted communication for transmission to an interception monitoring facility according to LI attributes of the protocol information elements.

\* \* \* \* \*